US006312152B2

(12) United States Patent
Dee et al.

(10) Patent No.: US 6,312,152 B2
(45) Date of Patent: Nov. 6, 2001

(54) ELECTRONIC MODULE FOR CONVENTIONAL PARKING METER

(75) Inventors: Mark R. Dee, New Maryland; James J. Richard, Fredericton, both of (CA)

(73) Assignee: Metervision.com Inc., Fredericton (CA)

( * ) Notice: Subject to any disclaimer, the term of this patent is extended or adjusted under 35 U.S.C. 154(b) by 0 days.

(21) Appl. No.: 09/411,068

(22) Filed: Oct. 4, 1999

Related U.S. Application Data

(63) Continuation of application No. 09/192,640, filed on Nov. 16, 1998, now Pat. No. 5,966,345, which is a continuation of application No. 08/980,610, filed on Dec. 1, 1997, now Pat. No. 5,903,520, which is a continuation of application No. 08/661,470, filed on Jun. 11, 1996, now Pat. No. 5,710,743.

(51) Int. Cl.[7] .............................. G04F 1/00; G07F 17/24; B60Q 1/48

(52) U.S. Cl. ......................... 368/90; 194/217; 340/932.2; 340/933

(58) Field of Search .................................... 368/7, 90, 92; 194/200, 202, 203, 217–219, 317, 320, 334, 339; 340/932.2, 933

(56) References Cited

U.S. PATENT DOCUMENTS

| | | | |
|---|---|---|---|
| 3,091,918 | 6/1963 | Collins et al. | 58/142 |
| 3,535,870 | 10/1970 | Mitchell | 58/142 |
| 3,999,372 | 12/1976 | Welch et al. | 58/142 |
| 4,043,117 | 8/1977 | Maresca et al. | 58/142 |
| 4,482,258 | 11/1984 | Kiehl et al. | 368/90 |
| 4,823,928 | 4/1989 | Speas | 194/217 |
| 4,825,425 | 4/1989 | Turner | 368/7 |
| 4,872,149 | 10/1989 | Speas | 368/90 |
| 4,876,540 | 10/1989 | Berthon et al. | 340/932.2 |
| 4,908,617 | 3/1990 | Fuller | 340/932.2 |
| 4,967,895 | 11/1990 | Speas | 194/200 |
| 5,029,094 | 7/1991 | Wong | 364/467 |
| 5,065,156 | 11/1991 | Bernier | 340/932.2 |
| 5,088,073 | 2/1992 | Speas | 368/90 |
| 5,103,957 | 4/1992 | Ng et al. | 194/217 |
| 5,109,972 | 5/1992 | Van Horn et al. | 194/217 |
| 5,184,707 | 2/1993 | Van Horn et al. | 194/204 |
| 5,266,947 | 11/1993 | Fujiwara et al. | 340/932.2 |
| 5,360,095 | 11/1994 | Speas | 194/217 |
| 5,407,049 | 4/1995 | Jacobs | 194/200 |
| 5,422,624 | 6/1995 | Smith | 340/438 |
| 5,442,348 | 8/1995 | Mushell | 340/932.2 |
| 5,454,461 | 10/1995 | Jacobs | 194/200 |
| 5,475,373 | 12/1995 | Speas | 340/815.58 |
| 5,570,771 | 11/1996 | Jacobs | 194/200 |

FOREIGN PATENT DOCUMENTS 2097099 3/1994 (CA) .

*Primary Examiner*—Vit Miska
(74) *Attorney, Agent, or Firm*—Seed IP Law Group PLLC

(57) ABSTRACT

An electronic module for enhancing an operation of a conventional parking meter. The electronic module comprises a shell defining a hollow conformation and being attachable to a conventional parking meter, in substitution to an upper housing portion of that conventional parking meter. The electronic module has a meter condition sensor for detecting from a distant point one of the time expiry indicator and the violative condition indicator of that parking meter, when the indicator is in an indicating mode, and a vehicle sensor affixed to the shell for detecting from a distant point, a parked vehicle. The electronic module further has: an electronic circuitry mounted inside the shell and having a power source for operating the module; means for receiving a first signal from the meter condition sensor and a second signal from the vehicle sensor; means for processing the first and second signals and means for transmitting a coded message to a remote receiver. Each side of the shell has a light operable into an ON mode by the electronic circuitry simultaneously to a transmission of the coded message. There is also provided on a front face of the shell, an electronic display screen for displaying an advertisement message to a user of this parking meter, and on a top portion thereof, a solar panel to recharge the battery of the electronic circuitry.

37 Claims, 4 Drawing Sheets

| FIG. 7 |
| --- |
| FIG. 7A |
| FIG. 7B |

ELECTRONIC MODULE FOR CONVENTIONAL PARKING METER

CROSS-REFERENCE TO RELATED APPLICATION

This application is a continuation of U.S. patent application No. 09/192,640, filed Nov. 16, 1998 now Pat. No. 5,966,345; which is a continuation of U.S. Pat. application Ser. No. 08/980,610, filed Dec. 1, 1997; now U.S. Pat. No. 5,903,520; which is a continuation of U.S. Pat. application Ser. No. 08/661,470, filed Jun. 11, 1996, now U.S. Pat. No. 5,710,743.

FIELD OF THE INVENTION

The present invention relates to parking meters, and more particularly, it relates to an electronic module attachable to a conventional parking meter, for providing that conventional parking meter with features of modem electronic parking meters.

BACKGROUND OF THE INVENTION

Parking meters in general permit vehicles to be parked along a street for an allowable period of time, which is determined by the amount of money inserted therein. A mechanical clockwork or electronic timer inside the parking meter runs down the allowable time until it reaches zero time, and causes an overdue parking indication to appear through a window of that meter. In recent years, parking meters have been improved greatly by the development of low powered electronic circuitry, ultrasonic transmitters and receivers, and wireless communication systems.

Revenues from parking meters are normally used by municipalities to cover the ever-increasing costs of maintaining its infrastructure in a good condition. Therefore the improved modern meters are attractive for a municipality for increasing the revenues generated from its metered parking systems.

A first example of modem parking meters is disclosed in U.S. Pat. No. 5,454,461 issued on Oct. 3, 1995 to James P. Jacobs. The electronic parking meter described therein includes; means for detecting and determining the denomination of coins, a liquid crystal display having a digital tie counter, a sonar transducer for detecting the presence of vehicles, and an infrared transceiver enabling parking authority personnel to communicate with the meter. The meter is operated in three conditions including an off condition, an inactive condition and an active condition to provide conservation of power so that the meter is entirely battery operated.

Electronic parking meters having these described features are especially attractive to municipalities because all time expiry conditions thereof are readily communicated to parking authority personnel via a central computer. The parking authority personnel may thereby be effectively dispatched to those vehicles in violation of parking rules, to issue parking tickets to the owners of those vehicles. Such improvement of a metered parking system is known to increase revenues from those meters considerably.

Other examples of modern electronic parking meters are solar powered and also have liquid crystal displays, for displaying advertisement messages to users of metered parking spaces. These particular meters are disclosed in U.S. Pat. No. 5,442,348, issued on Aug. 15, 1995 to Joshua Mushell, and in U.S. Pat. No. 4,872,149 issued on Oct. 3, 1989 to Gary W. Speas. Hence, another source of income for a municipality having electronic parking meters is generated from the sale of advertising messages displayed on the liquid crystal displays of the meters, to businesses located near the metered parking spaces.

The replacement of a quantity of conventional mechanical meters with newer electronic models represents, nonetheless, a substantial investment of funds for the purchase of the electronic units, an investment of manpower time and wages for replacing the conventional meters by the electronic models, and a financial loss in the writing-off of the undepreciated value of the conventional meters. Therefore, in a period of budget restraint as during the present times, the acquisition of electronic meters is not economically feasible for many municipalities.

As an alternative to an entire replacement of conventional parking meters by electronic units, a number of retrofit electronic devices exists to enhance the operation of conventional parking meters. Such a unit mounts adjacent to a conventional parking meter, and connects to the clockwork of the meter. A first and second examples of these controllers are described in U.S. Pat. No. 3,535,870 issued on Oct. 27, 1970 to Harold B. Mitchell, and in U.S. Pat. No. 3,999,372, issued on Dec. 28, 1976 to Welch et al.

The controller of the first example or the control unit of the second example, comprises an ultrasonic transmitter and a receiver to detect the presence of a vehicle near a standard parking meter. Once the vehicle leaves the parking space, the meter is automatically returned to zero time such that a next vehicle cannot take advantage of the remaining time credit of the meter. In the first case, the controller is connected inside the meter to a mechanical switch, and has a solenoid for resetting the clock hand to a zero time position. Similarly, in the latter example, the control unit is connected to a pair of solenoids and a pair of mechanical switches mounted inside the meter head.

The installation of the retrofit units of the prior art requires intensive modifications to the clockwork of conventional parking meters. These modifications are usually better done by the original manufacturer of the meters. Therefore, the upgrading of a quantity of conventional meters with the retrofit units represents also a substantial investment in manpower time and wages to remove and send the meters to the manufacturer, and to reinstall the modified meters. Other expenses include the cost for modifying the clockwork, and the lost of revenue from the parking system when substitutable meters are not available to replace those meters removed for alteration.

SUMMARY OF THE INVENTION

In the present invention, however, there is provided an electronic module for enhancing an operation of a conventional parking meter having at least one of a time expiry indicator and a violative condition indicator.

The electronic module of the present invention comprises a shell defining a hollow conformation and having mounting means attachable to a conventional parking meter, and a first sensor affixed to that shell for detecting from a distant point the indicator of that conventional parking meter, when the shell is mounted on this conventional parking meter and when the indicator is in an indicating mode.

The electronic module also comprises a second sensor affixed to the shell for detecting from a distant point, a vehicle parked in a parking space at proximity of the conventional parking meter when that shell is mounted on the conventional parking meter.

The electronic module firer has an electronic circuitry mounted inside the shell and having a power source for operating the module. The electronic circuitry has means for receiving a first signal from the first sensor and a second signal from the second sensor, for processing the first and second signals, and when appropriate, for transmitting a coded message to a remote receiver. The coded message comprises at least an identification relative to a location of the conventional parking meter.

A first advantage of this first aspect of the present invention is that the electronic module is mountable on a conventional meter without modification or attachment to any of the internal components of the conventional parking meter. An installation of the electronic module over a conventional parking meter is thereby effected quickly and without tools, at the parking meter location.

Hence, a municipality managing conventional parking meters having each an electronic module of the present invention mounted thereon has the ability to generate more revenue from these conventional meters. A municipality managing the enhanced conventional meters has a better control over the metered parking system due to the fact that when a parking meter is in a time expiry condition or in a condition of violation, the coded message is transmitted to a remote receiver at the municipality headquarters for example. A law enforcement officer or metered parking attendant may thereby be effectively dispatched to a location of that parking meter to write and issue a parking ticket to the owner of the vehicle in the parking space.

Another advantage of the electronic module of the present invention is that a municipality managing an array of conventional parking meters and wanting to use the modern features of electronic parking meters does not have to write off the remaining undepreciated monetary worth of their conventional parking meters.

It is a common fact with conventional mechanical parking meters that the clockwork and coin receiving and registering mechanism have a useful life which is generally much longer than a duration of its period of technological novelty. The electronic module of the present invention takes advantage of the endurance of the mechanical components of conventional parking meters to prolong the modernness of these installations, and to extend a duration of their depreciable life. Therefore the addition of an electronic module of the present invention to a conventional parking meter adds to the net worth of a municipality's assets and eliminates the capital write-off normally associated with a change-over to a modem electronic meter.

In accordance to a second aspect of the present invention, the shell of the electronic module has a first and second spaced apart faces enclosed by a first and second sides and a top portion. The first and second sides have each a light operable into an ON mode by the electronic circuitry at substantially a same time as a transmission of the coded message. The lights are operable into an OFF mode by a timer comprised in the electronic circuitry, or by an reset receiver on the first face of the shell. When that shell is mounted on a conventional parking meter and these lights are in an ON mode, the conventional parking meter is visible from a great distance as compared to other conventional parking meters.

A law enforcement officer tending parking meters may thereby readily identify from a distant location, a corner of a street for example, all parking meters on that street indicating a time expiry condition or a condition of violation. This feature is particularly useful for reducing the officer's usual inspection of all meters along a designated route in order to identify those indicating an infiging condition.

In accordance to a third aspect of the present invention, the electronic module comprises broadly a shell defining a hollow conformation and having mounting means attachable to a conventional parking meter. The electronic module also comprises an electronic circuitry mounted inside the shell and having a power source for operating the module. The electronic module of this third aspect of the present invention further has an electronic liquid crystal display screen mounted on a face of the shell for displaying promotional messages to users of the conventional parking meter.

The electronic display screen is connected to a programmable memory capable of storing several characters of a complete message, and to an input circuitry for controlling an operation thereof The electronic circuitry has a communication receiver for receiving a message to be displayed on the liquid crystal display screen, and for storing this message in the programmable memory.

An advantage of this third aspect of the present invention is that promotional messages are optionally displayed to users of a conventional parking meter having the electronic module mounted thereon. These messages are preferably displayed continually during daylight time when the power source is a solar panel for example.

Alternatively, the electronic module of this third aspect of the present invention may comprise a vehicle sensor affixed to the shell for detecting from a distant point a vehicle parked in a parking space at proximity on the conventional parking meter. In this latter case, a first signal is received from the vehicle sensor and relayed to the input circuitry for activating a first and a second timer controlling an operation of the electronic display screen. The promotional messages are preferably displayed on this optional third aspect of the present invention, from a time soon after a vehicle parks near the parking meter and for a pre-determined duration thereafter.

Hence, a municipality managing a conventional parking meter having the electronic module according to this third aspect of the present invention mounted thereon can generate income from a commercial establishment located near the parking meter for example, by selling and displaying advertisement messages pertaining to this establishment.

In accordance to yet a further aspect of the present invention, the electronic module fits on top of a conventional parking meter having a intermediate housing containing a coin receiving and registering mechanism, a clockwork and an opened upper end having a number of latch members about that opened upper end. The conventional parking meter also normally has an upper housing having an opened plane and a set of catch members near that opened plane. The set of catch members being removably attachable to the number of latch members of the intermediate housing such that the opened plane normally fits atop the opened upper end, and that the upper housing covers the intermediate housing.

In this latter aspect of the present invention, the electronic module comprises a shell having an opening and a set of clasp members near that opening. The set of clasp members being substantially similar in shape, spacing and number as the set of catch members, whereby the shell is optionally removably attachable to the intermediate housing in substitution to the upper housing.

Furthermore, the opening of the shell has a substantially similar outline as a contour and dimensions of the opened plane, whereby when the shell is mounted on the opened upper end of the intermediate housing, the shell is aesthetically and securely compatible with the intermediate housing relative to a conventional mounting of the upper housing on the intermediate housing.

BRIEF DESCRIPTION OF THE DRAWINGS

The preferred embodiments of the invention will be further understood from the following description, with reference to the drawings in which.

DETAILED DESCRIPTION OF THE PREFERRED EMBODIMENT

Figure 1:
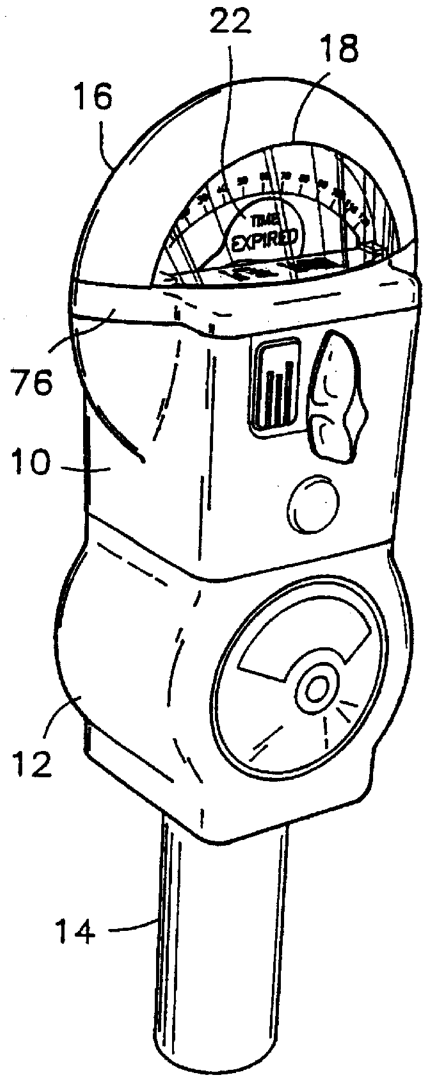
FIG. 1 PRIOR ART
FIG. 1 is a front and left side perspective view of a conventional parking meter.
Figure 2:
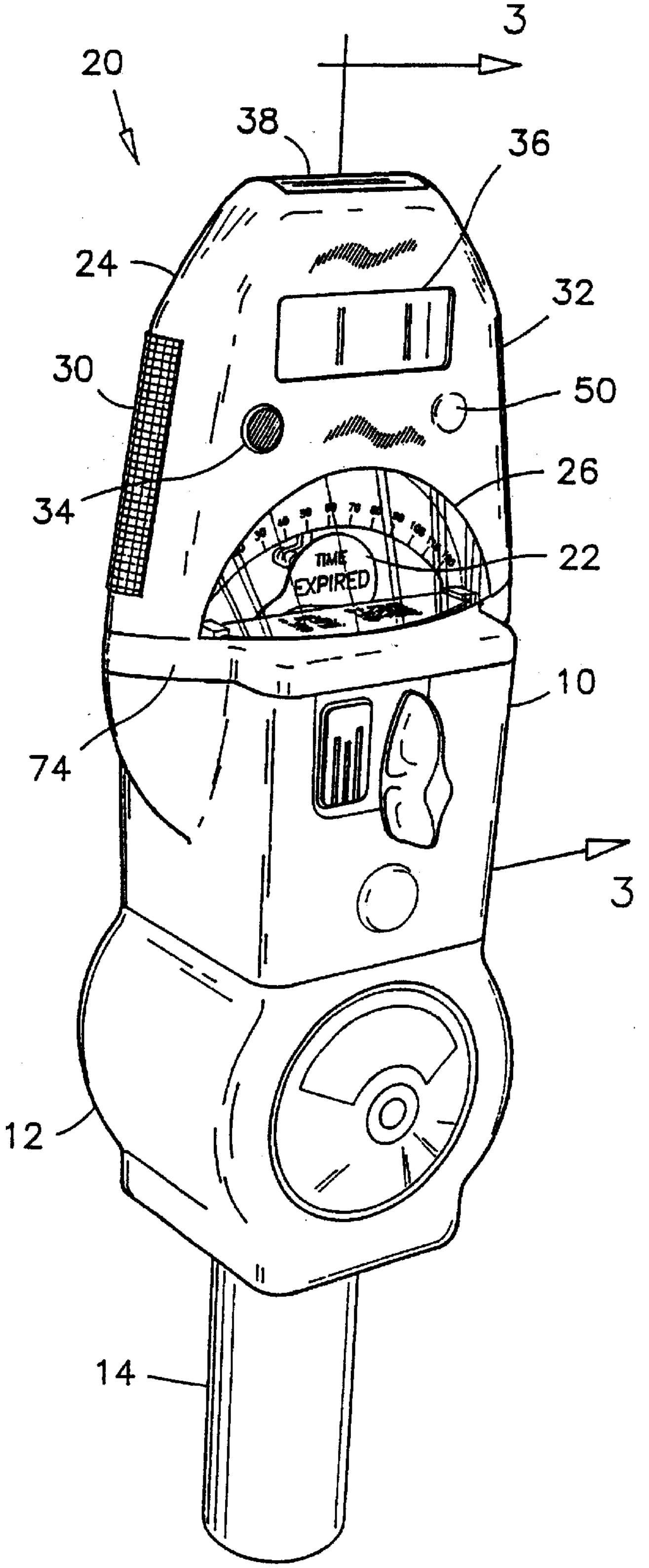
FIG. 2 is a front and left side perspective view of a conventional parking meter with the electronic module of the present invention mounted thereon.

Referring to FIGS. 1 and 2, a conventional parking meter of the prior art normally has an intermediate housing 10 containing a clockwork and a coin receiving and registering mechanism. The conventional parking meter generally also has a coin collection portion 12 which is attached to a support post 14. The conventional parking meter of the prior art also normally has an upper housing 16 having a transparent window 18 for covering a time indicating dial, a time pointer pointing at this dial, a time expiry flag and a violative condition flag. The internal components of this conventional parking meter are not all illustrated herein for not being part of the present invention, and for being common to a person having ordinary knowledge of parking meters.

The upper housing 16 is normally removably retained to the intermediate housing 10 by catch and latch members which will be explained in greater details when making reference particularly to FIGS. 3, 4 and 5.

The internal components of a conventional parking meter, as well as the intermediate housing 10 and coin collection housing portion 2 are normally made of cast iron, aluminium or stainless steel having a good resistance to wear, corrosion and rough handling. Therefore at a time when municipalities are considering the features of the modern electronic parking meters, there still exists a multitude of conventional meters which have not yet reached their useful life expectancy.

The electronic module 20 of the preferred embodiments is mounted on the intermediate housing 10 of a conventional parking meter, in substitution to the upper housing 16. The electronic module 20 has similar mounting attachments as those of the upper housing 16, as will be explained later, such that it is readily mountable on the intermediate housing 10 without using any tools and without modifying the intermediate housing 10.

One of the key features of the electronic module 20 of the first preferred embodiment is that it detects a raised position of one of the time expiry flag 22 and of the violative condition flag of the conventional parking meter. This detection is effected without touching the flag 22 such that there is no physical connection between the electronic module 20 and the clockwork or the coin receiving and registering mechanism of the conventional meter.

The electronic module 20 of the preferred embodiments enhance the operation of a conventional parking meter while using all of the mechanical movements and lower housing portions of that meter such that the remaining life of that conventional meter may be fully utilized.

The electronic module of the first preferred embodiment 20 comprises a shell 24 defining a hollow conformation, and having a transparent window 26 being substantially the same size and shape as the transparent window 18 of the upper housing 16 of the prior art. The shell 24 of the first preferred embodiment preferably has a first window 26 on the front face thereof and a similar second window 26' on the rear face thereof, such that a user of the parking meter having an electronic module 20 mounted thereon has a similar visual access to the time pointer and time indicating dial of the meter as one would normally have with the upper housing 16 of the prior art.

The shell 24 of the electronic module of the first preferred embodiment further has a light 30 on a left side thereof and a similar light 32 on the right side thereof. These lights 30,32 are operable in an ON mode by an electronic circuitry inside the shell 24 upon a time expiry condition or a condition of violation of the parking meter. The lights 30,32 are operable in an OFF mode by a timer comprised in the electronic circuitry, or by a reset receiver 34 on a front face of the shell 24. The operation of the lights 30,32 improves the visibility of the electronic module whereby a law enforcement officer can identify a meter in an expiry condition from across a street or from an intersection of two streets for example.

In this first preferred embodiment, the reset receiver 34 is an infrared-type receiver responsive to an infrared transmitter, which is preferably enclosed in a portable electronic unit carried by the officer issuing parking tickets.

The electronic module 20 of the first preferred embodiment also has an electronic liquid crystal display 36 on the front face of the shell 24. The electronic display may exhibit messages to instruct a user about metered parking regulations, but it is preferably used to promote businesses located near that meter.

The operation of the electronic liquid crystal display 36 preferably starts once a vehicle arrives at a parking space in front of the meter, or soon thereafter when the driver of this vehicle walks towards the meter. The display continues to scroll or pulse the message for a programmed period of time, which is normally sufficient for displaying the entire message at least once or twice. Once the programmed time value is reached, the electronic circuitry of the module 20 shuts OFF the electronic liquid crystal display 36 such that a power consumption of the electronic module is maintained as low as possible.

The liquid crystal display has an input circuitry for controlling an operation thereof, and a programmable memory which is preferably erasable and re-programmable in a wireless mode through an infrared receiver. The infrared receiver is preferably the same receiver 34 as is used to shut off the lights 30,32. The memory of the display 36 is preferably programmed using a portable computer (not shown) having an infrared transmitter being able to communicate with the infrared receiver 34 of the display 36.

The electronic module 20 of the first preferred embodiment further has on a top portion thereof, a solar panel 38 made of an array of solar cells. The solar panel is connected to a battery charging means of the electronic circuitry of the module 20, to recharge the battery of the electronic module during daylight time.

Thereupon, the features of the electronic module of a second preferred embodiment may be limited to those of a liquid crystal display screen as just described, whenever a municipality selects this single option. In this case, the power source of the electronic circuitry may be limited to the output of the solar panel 38, and the message is preferably displayed continuously whenever an ambient light intensity is sufficient to generate the required energy.

Figure 3:
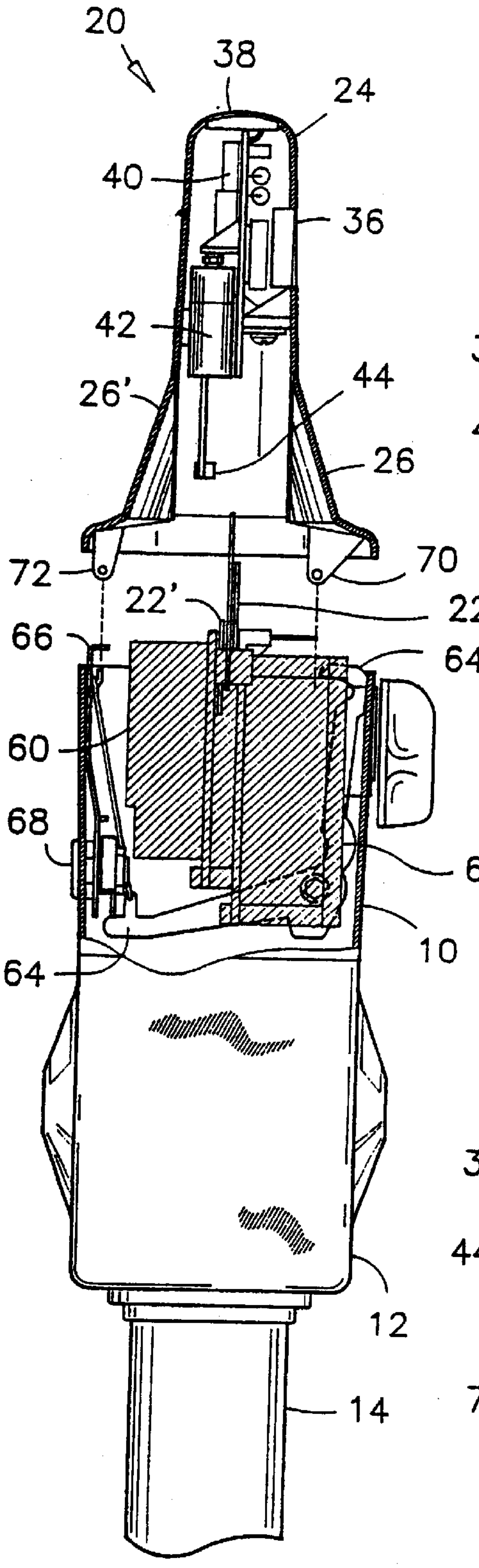
FIG. 3 is a cross section of a conventional parking meter and of the electronic module of the present invention through line 3—3 of FIG. 2, wherein the electronic module of the present invention is slightly raised from an intermediate housing portion of the conventional parking meter.
Figure 4:
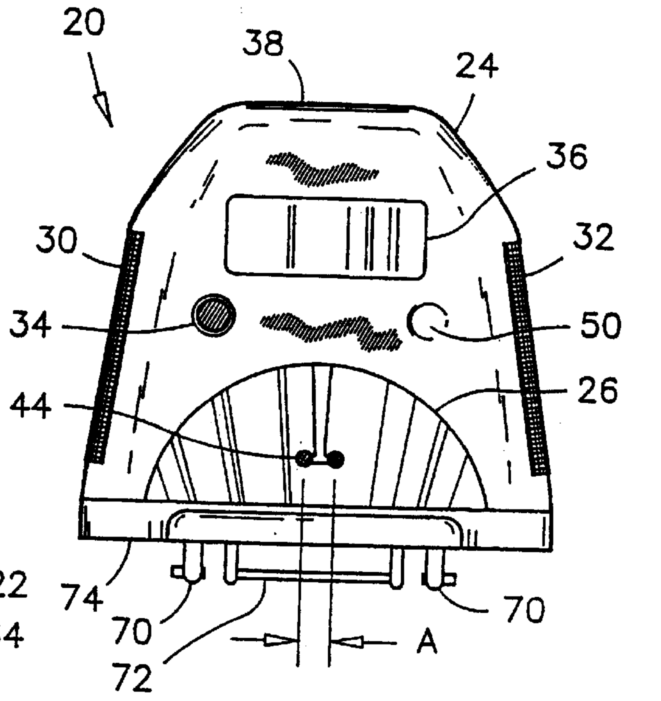
FIG. 4 is a front view of the electronic module of the present invention.
Figure 5:
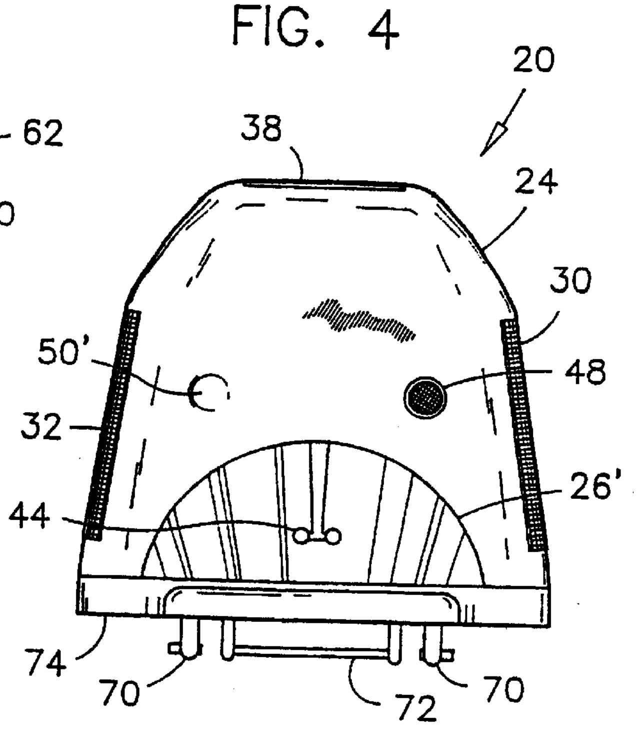
FIG. 5 is a rear view of the electronic module of the present invention.

Referring now to FIGS. 3, 4 and 5, the electronic circuitry of the module 20 of the first preferred embodiment is indicated by numeral 40, and the battery supplying electrical power to the electronic circuitry is indicated by numeral 42. The electronic circuitry 40 also has a meter condition sensor 44 hanging downward therefrom and being positioned at a distance from the time expiry flag 22 and from the violative condition flag 22' of the conventional parking meter. When the flags 22,22' are made of ferrous metal, the meter condition sensor 44 is preferably a magnetic type proximity sensor mounted at proximity of the flags 22, 22', such that it is responsive to a raised position of one of these flags 22,22'. When the flag 22,22' are made of a material not detectable in a magnetic field, the meter condition sensor 44 is preferably a photoelectric-type sensor having its light beam oriented to reflect on one of the flags 22,22' when this flag is in an upper indicating position.

A preferred configuration of the meter condition sensor 44 of the electronic module 20 of the first preferred embodiment is a pair of photoelectric-type sensors connected in series to one-another, and spaced apart a distance indicated by label 'A'. This distance 'A' is preferably wider than a width of the time pointer (not shown) of the conventional parking meter. The advantage of this configuration is that the time pointer intersecting any one of the light beams of the meter condition sensor 44 does not cause the electronic circuitry 40 to read an infringing condition of the meter. The flags 22 or 22' being much wider than the time pointer (not shown) intersects both beams simultaneously causing a violative or time expiry condition signal to be sent to the electronic circuitry 40.

A number of different types of mechanical and electro-mechanical conventional parking meters have an electronic timer and a flashing light to indicate a time expiry condition or a mechanical failure of the coin receiving and registering mechanism. In that respect, it will become apparent to the person having an ordinary skill in the art of electronics that a similar photoelectric switch 44 responsive to light intensity, may be used to detect the operation of the flashing light on a conventional parking meter of that type. Accordingly, the electronic module 20 of the present invention is also usable with those electronic or electro-mechanic conventional parking meters of recent times.

Referring now to FIG. 5, the electronic module 20 of the first preferred embodiment has a vehicle sensor 48 on a rear face thereof to detect the presence of a vehicle in the metered parking space. This vehicle sensor 48 is preferable an ultrasonic sensor similar to those commonly used in modern electronic parking meters as described earlier.

The shell 24 preferably has thin spots 50,50' on its front and rear faces respectively. These thin spots are easily drilled through such that the infrared reset receiver 34 or the vehicle sensor 48 may optionally be mounted on a right hand or a left hand portion of the front and rear faces of the shell to accommodate a location of the meter relative to the metered parking space for example.

Referring back to FIG. 3 there is illustrated, a partial cross-section of a conventional parking meter. The intermediate housing 10 generally comprises a clockwork 60 and a coin receiving and registering mechanism 62 on the top of which there is the abnormal condition flags 22,22'. The intermediate housing 10 further has a pair of front latch members 64, and a rear latch member 66 which is movable in an up and down position. The rear latch member 66 is lockable in a down position by a keyed lock 68.

The shell 24 of the electronic module of the preferred embodiments has a pair of front clasp members 70 which are substantially similar to those of a pair of front catch members (not shown) of the upper housing 16 of the prior art. There is also provided a rear clasp member 72 which is substantially similar to a rear catch member (not shown) of the upper housing 16 of the prior art. Furthermore, the shell 24 of the electronic module 20 of the preferred embodiments has an opening on its lower end which has an outline 74 similar in shape and dimensions as a contour of a lower opened plane 76 of the upper housing 16 of the prior art, as better seen on FIGS. 1 and 2.

The structural similarities thus described enable a mounting of the electronic module 20 of the preferred embodiments in substitution to the upper housing 16 of the prior art. The clasp members 70,72 engage with the latch members 64,66 in a similar manner as a mounting of the upper portion 16 on the intermediate housing 10. The structural similarities also ensure that an opened upper end of the intermediate housing 10 is properly sealed from dust and weather conditions, and that the electronic module 20 is aesthetically compatible with the lower portions 10,12 of the conventional parking meter.

Referring now to the electronic circuitry 40 of the electronic module 20 of the first preferred embodiment, the actual circuit diagrams are not provided herein for being common to persons knowledgeable in electronic control devices. Accordingly, a person having a general knowledge of electronic circuitry using the instructions given herein should be able to construct the electronic circuitry 40 for the module 20 of the first preferred embodiment. The electronic circuitry 40 comprises broadly the following essential functions: receiving power from a battery; receiving a first signal from the meter condition sensor 44; receiving a second signal from the vehicle sensor 48; processing the first and second signal; and when appropriate, transmitting a coded message to a remote receiver.

The coded message is preferably transmitted when the violative condition flag, or the expiry condition flag is in a raised position, and when a vehicle is parked in the metered parking space. A second condition for transmitting the coded message is when a parking space has been occupied for a period longer than a prescribed maximum duration as allowed by municipal bylaws.

The message to be transmitted to a remote receiver, to a central computer at the municipality headquarters for example, comprises an indication of the location of the meter, and an indication that the parking meter is in an infringing condition. A parking meter attendant verifying regularly with the central computer, is able to locate parking meters in a condition of infringement, and to go directly to those meters to issue parking tickets. The efficiency of the parking meter attendant is thereby improved considerably.

The transmitter of the electronic module 20 is preferably a wireless transmitter such that an installation of the electronic module 20 over a conventional parking meter does not require any external wiring.

Similarly, the receiver 34 as previously described, may alternatively be a radio-wave type receiver, or other types of modern receivers capable of receiving a wireless communication. The programming of the memory of the electronic display screen 36 or a resetting of the lights 3032 to an OFF mode may thereby be effected from a remote central computer having a wireless communication transmitter.

Figure 6:
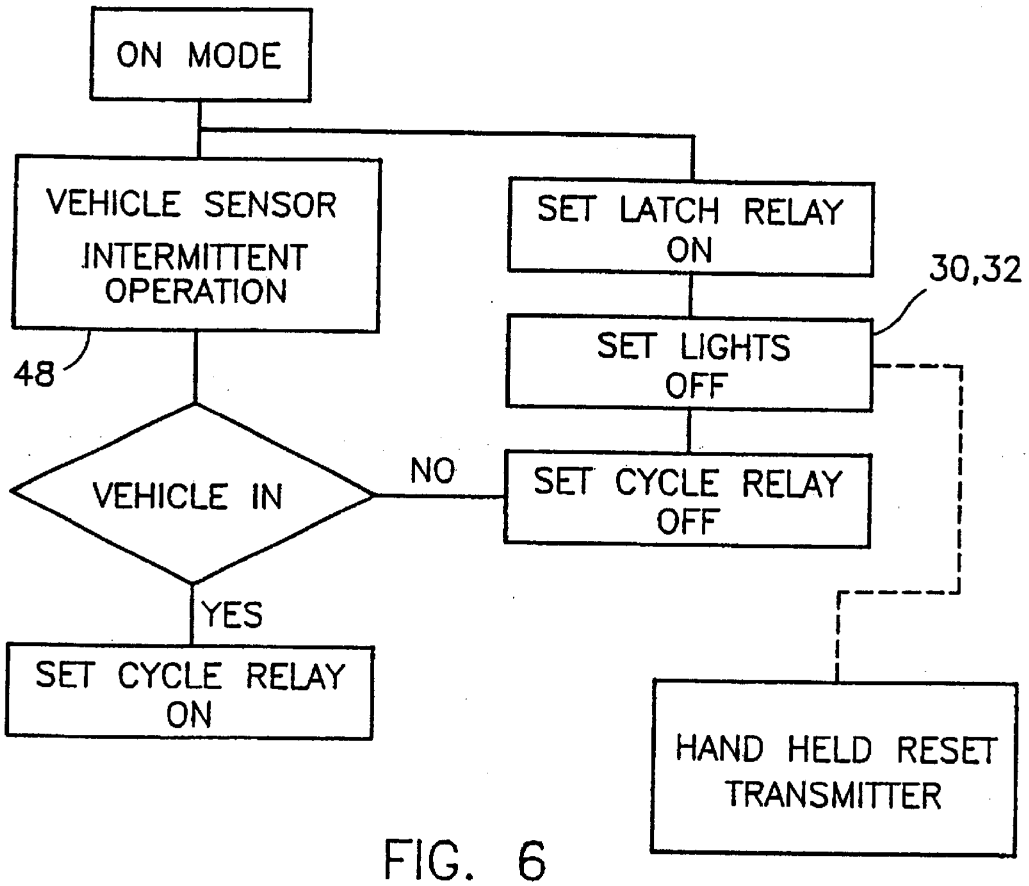
FIG. 6 is a logic diagram explaining an operation of the vehicle sensor of the electronic module of the first preferred embodiment.
Figure 7A:
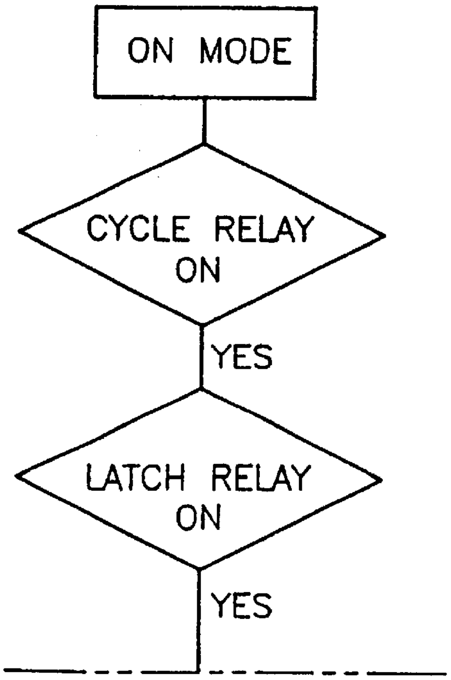
FIG. 7 is a logic diagram explaining an operation of the liquid crystal display and of the meter condition sensor of the electronic module of the first preferred embodiment
Figure 7B:
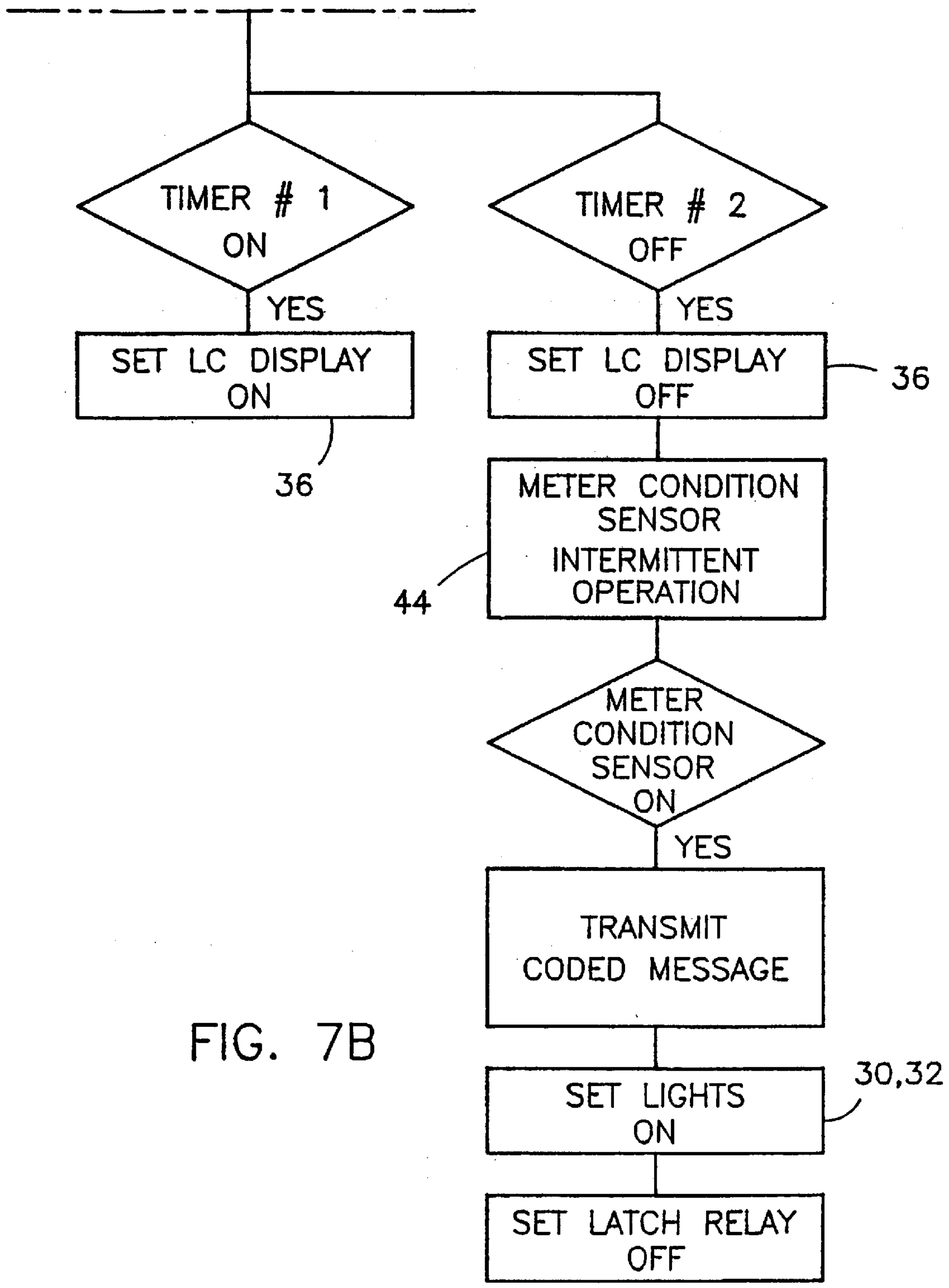

Referring now to FIGS. 6 and 7, the preferred method of operation of the electronic module 20 of the first preferred embodiment is illustrated therein and described as follows in steps form:

a) The vehicle sensor 48 intermittently verifies the presence of a vehicle in a parking space;

b) The vehicle sensor 48 acknowledges the presence of a vehicle and closes a cycle relay activating a first and second timer;

c) The first timer activates the liquid crystal display 36 which exhibits an advertisement message for the preset period of time of the second timer;

d) Once the preset time of the second timer is expired, the meter condition sensor 44 verifies that both flags 22,22' are in a lower position;

e) If the meter condition sensor 44 detects one of the expiry time flag 22 and the violative condition flag 22' in a raised position, and the vehicle sensor 48 continues to acknowledge a vehicle in the metered parking space, a transmitter transmits a coded message to a remote receiver, and the lights 30,32 are switched to an ON mode;

f) Once a message is transmitted, a latch relay is opened to open the circuit energizing the display 36 and the coded message transmitter. The latch relay closes the circuit again only when the vehicle leaves the parking space, such that a coded message is only transmitted once per parking violation.

g) The lights 30,32 are switched OFF by the vehicle sensor 48 once the vehicle in the metered parking space leaves the parking space or else, the lights are turned OFF by the law enforcement officer activating a hand held infrared transmitter communicating with the infrared receiver 34.

h) If the vehicle sensor 48 does not detect the presence of a vehicle, the cycle relay is opened and the latch relay is closed such that a next vehicle will set a new cycle.

In the above preferred method of operation, the duration of the first timer is sufficient for a driver of a vehicle to park his vehicle and to walk towards the parking meter. The duration of the second sensor is sufficient for allowing this driver to insert coins in the parking meter and to walk away from the meter.

In the above preferred method of operation, both the vehicle sensor and the meter condition sensor operate in an intermittent mode such that a power consumption of the electronic module 20 is maintained at a low level.

The electronic circuitry 40 of the first preferred embodiment may advantageously comprise additional functions to further enhance the operation of a conventional parking meter. In this respect, a dormant mode may be incorporated in the circuitry to still lessen the consumption of power by the module between vehicles, and during periods of free access to parking spaces. Other practical features for the electronic module of the present invention are numerous and include for examples, the accumulation of statistics about a metered parking system such as tracking the usage time and frequency of some parking spaces as compared to others.

While the above description provides a full and complete disclosure of the preferred embodiment of this invention, various modifications, alternate constructions and equivalents my be employed without departing from the true spirit and scope of the invention. Such changes might involve alternate circuitry, components, structural arrangements, operable features or the like. Therefore the above description and accompanying illustrations should not be construed as limiting the scope of the invention which is defined by the appended claims.

What is claimed is:

1. An electronic module for enhancing operation of a meter having an indicator, and operating in response to a remote transmitter transmitting an information signal containing reprogramming information, said electronic module comprising:

a shell defining a hollow conformation attachable to the meter;

a sensor detecting a condition of the indicator when said shell is attached to the meter and the indicator is in an indicating mode, said sensor generating a signal indicative of said detected condition of the indicator;

a receiver configured to receive the information signal from the remote transmitter;

a memory storing changeable operational information; and electronic circuitry connected to receive said condition indicating signal from said sensor and process said condition indicating signal to generate a message in response to said condition indicating signal, said message including at least an identification of said detected condition of the indicator, such that when said electronic module is used with the meter, said message identifies said detected condition of the indicator, said electronic circuitry configured to perform a function based on said stored operational information in said memory, and said electronic circuitry connected to receive said information signal from said receiver and to store in said memory said reprogramming information contained in said information signal as said stored operational information for future use by said electronic circuitry.

2. The electronic module of claim 1 for use with the remote transmitter being one of a wireless and infrared transmitter, and wherein the receiver is a corresponding one of a wireless and infrared receiver.

3. The electronic module of claim 1 for use with the remote transmitter being one of a wireless and infrared hand-held transmitter, and wherein the receiver is a corresponding one of a wireless and infrared receiver.

4. The electronic module of claim 1 wherein the indicator includes a mechanical member which changes position to indicate said condition thereof, and said sensor senses position movement of the mechanical member.

5. The electronic module of claim 4 wherein said sensor is a sensor producing a light beam directed to strike the mechanical member and thereby sensing position movement of the mechanical member.

6. The electronic module of claim 1 wherein the indicator generates a light beam which changes to indicate said condition thereof, and said sensor produces an electrical signal in response to sensing said light beam, thereby sensing the condition of the indicator.

7. The electronic module of claim 1 wherein said electronic circuitry transmits said message to a remote receiver to identify said detected condition of the indicator.

8. The electronic module of claim 1 further including an electronic display mounted to said shell and configured to display an informational message to a user of the meter, and wherein said stored operational information includes at least information for display on said electronic display, and said function performed by said electronic circuitry based on said stored operational information in said memory is to generate said stored informational message on said electronic display.

9. The electronic module of claim 1 for use when the indicator is a light source, wherein said sensor is photoelectric type sensor responsive to a light intensity of the light source.

10. The electronic module of claim 1 for use with a meter which is a conventional parking meter having a time indicating dial and a time pointer pointing at the dial, wherein said sensor includes a pair of photoelectric sensors electrically connected in series with one-another and having their respective beam spaced apart a distance greater than a width of the time pointer, during an operation of the parking meter when said shell is mounted on the parking meter, the time pointer intersecting any one of said beams does not cause said signal.

11. The electronic module of claim 1 wherein said electronic circuitry further comprises timer means for effecting an intermittent operation of said sensor.

12. The electronic module of claim 1 for use with a meter which is a conventional parking meter having a time indicating dial and a time pointer pointing at the dial, wherein said shell has a transparent window on a first side thereof being substantially similar in shape as an area defined by the dial, said window being further horizontally and vertically mountable in alignment with the dial, such that when said shell is mounted on the parking meter, a user of the parking meter has a visual access through said window to the time pointer and the dial.

13. The electronic module of claim 1 for use with a meter which is a conventional parking meter having parking time indicating means, wherein said shell further includes a window in substantially horizontal and vertical alignment with the parking time indicating means.

14. The electronic module of claim 1 for use with a meter which is a conventional parking meter having an intermediate housing having an upper end, and wherein said hollow conformation has an opening and said opening has a contour and dimensions as those of the upper end of the intermediate housing.

15. An electronic module for enhancing operation of a meter having an indicator, and operating in response to a remote transmitter transmitting an information signal containing reprogramming information, said electronic module comprising:

a sensor detecting a condition of the indicator when the indicator is in an indicating mode, said sensor generating a signal indicative of said detected condition of the indicator;

a receiver configured to receive the information signal from the remote transmitter;

a memory storing changeable operational information; and electronic circuitry connected to receive said condition indicating signal from said sensor and process said condition indicating signal to generate a message in response to said condition indicating signal, said message including at least an identification of said detected condition of the indicator, such that when said electronic module is used with the meter, said message identifies said detected condition of the indicator, said electronic circuitry configured to perform a function based on said stored operational information in said memory, and said electronic circuitry connected to receive said information signal from said receiver and to store in said memory said reprogramming information contained in said information signal as said stored operational information for future use by said electronic circuitry.

16. The electronic module of claim 15 wherein said electronic circuitry is configured to transmit said message to a remote receiver, and wherein when said electronic module is used with the meter, said message is transmitted to the remote receiver to identify said detected condition of the indicator.

17. The electronic module of claim 15 further including a vehicle proximity sensor configured to sense the presence of a vehicle in a parking location associated with the meter.

18. The electronic module of claim 15 wherein the indicator generates a light beam which changes to indicate said condition thereof, and said sensor produces an electrical signal in response to sensing said light beam, thereby sensing the condition of the indicator.

19. An electronic module for enhancing operation of a meter having an indicator, and operating in response to a remote transmitter transmitting an input signal, said electronic module comprising:

a shell defining a hollow conformation attachable to the meter;

a sensor detecting a condition of the indicator when said shell is attached to the meter and the indicator is in an indicating mode, said sensor generating a signal indicative of said detected condition of the indicator;

a receiver configured to receive the input signal from the remote transmitter; and electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the meter, said message identifies said detected condition of the indicator, said electronic circuitry connected to receive said input signal from said receiver, said electronic circuitry configured to change from a first operational state to a second operational state in response to said input signal received from said receiver.

20. The electronic module of claim 19 further including a light with an ON mode and an OFF mode, and wherein said first operational state of said electronic circuitry is with said light in said ON mode and said second operational state of said electronic circuitry is with said light in said OFF mode, and said electronic circuitry changes said light from said ON mode to said OFF mode in response to said input signal received from said receiver.

21. The electronic module of claim 19 further including a display device configured to display at least first and second informational messages, and wherein said first operational state of said electronic circuitry is having said display device display said first informational message and said second operational state of said electronic circuitry is having said display device display said second informational message, and said electronic circuitry changes said display from said first informational message to said second informational message in response to said input signal received from said receiver.

22. An electronic module for enhancing operation of a meter having an indicator, and operating in response to a remote transmitter transmitting an input signal containing operating instructions, said electronic module comprising:

a sensor detecting a condition of the indicator when the indicator is in an indicating mode, said sensor generating a signal indicative of said detected condition of the indicator;

a receiver configured to receive the input signal from the remote transmitter; and electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the meter, said message identifies said detected condition of the indicator, said electronic circuitry connected to receive the input signal containing the operating instructions from said receiver and configured to change operation in accordance with the operating instructions received.

23. An electronic module for enhancing operation of a meter having an indicator, and operating in response to a remote transmitter transmitting an input signal, said electronic module comprising:

a shell defining a hollow conformation attachable to the meter;

a first sensor detecting a condition of the indicator when said shell is attached to the meter and the indicator is in an indicating mode, said first sensor generating a signal indicative of said detected condition of the indicator;

a second sensor detecting an input condition and generating an input condition signal; and electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the meter, said message identifies said detected condition of the indicator, said electronic circuitry connected to receive said input condition signal from said second sensor, said electronic circuitry configured to change from a first operational condition to a second operational condition in response to said input condition signal received from said second sensor.

24. The electronic module of claim 23 further including a display with an OFF mode and an ON mode displaying an informational message, and wherein said first operational condition of said electronic circuitry is having said display in said OFF mode and said second operational condition of said electronic circuitry is having said display in said ON mode, and said electronic circuitry changes said display from said OFF mode to said ON mode in response to said input condition signal received from said second sensor.

25. The electronic module of claim 24 wherein said input condition sensed by said second sensor is the presence of a user near the meter.

26. The electronic module of claim 24 wherein said second sensor is a proximity sensor and said input condition sensed by said proximity sensor is the presence of one of a vehicle and a person near the meter.

27. The electronic module of claim 23 wherein said electronic circuitry is configured to transmit said message to a receiver, such that when said electronic module is used with the meter, said message is transmitted to said receiver to identify said detected condition of the indicator, and said input condition sensed by said second sensor is the presence of a vehicle in a space associated with the meter, wherein said first operational condition of said electronic circuitry is allowing said message to be transmitted to the receiver and said second operational condition of said electronic circuitry is preventing said message from being transmitted to the receiver more than a preselected number of times while the sensed vehicle is sensed by the second sensor as being in the associated space.

28. The electronic module of claim 23 further including a light with an ON mode and an OFF mode, and wherein said first operational condition of said electronic circuitry is with said light in said ON mode and said second operational condition of said electronic circuitry is with said light in said OFF mode, and said input condition sensed by said second sensor being the presence of a vehicle in a space associated with the meter, said electronic circuitry changing said light from said ON mode to said OFF mode in response to said input condition signal received from said second sensor when said second sensor no longer senses the sensed vehicle present in the associated space.

29. An electronic module for enhancing operation of a parking meter having an indicator, said electronic module comprising:

a shell defining a hollow conformation attachable to the parking meter;

a sensor detecting a condition of the indicator when said shell is attached to the parking meter and the indicator is in an indicating mode, said sensor generating a signal indicative of said detected condition of the indicator; and electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the parking meter, said message identifies said detected condition of the indicator, said electronic circuitry transmitting said message to a receiver, such that when said electronic module is used with the parking meter, said message is transmitted to said receiver to identify said detected condition of the indicator.

30. The electronic module of claim 29 wherein said receiver is a remote receiver.

31. The electronic module of claim 29 for use when the indicator is at least one of a time expiry indicator and a violative condition indicator, the electronic module further including a vehicle sensor for detecting from a distant point a vehicle parked in a parking space in proximity with the parking meter and generating a vehicle signal, said electronic circuitry receiving said vehicle signal from said vehicle sensor, and processing said vehicle signal.

32. The electronic module of claim 29 wherein said electronic circuitry transmits said message to said receiver, said message comprising at least an identification relative to a location of the parking meter, whereby when said electronic module is mounted on the parking meter and said message is transmitted to said receiver, a law enforcement officer in communication with said receiver may be effectively dispatched to said location of the parking meter.

33. The electronic module of claim 29 for use with a conventional parking meter having an intermediate housing containing a coin receiving and registering mechanism, a clockwork and an opened upper end having latch members about the opened upper end, and an upper housing having an opened plane and catch members near the opened plane, the catch members being removably attachable to the latch members of the intermediate housing such that the opened plane normally fits over the opened upper end and the upper housing covers the opened upper end, wherein said shell has an opening and mounting means including clasp members near said shell opening, said clasp members being substantially similar in shape, spacing and number as the catch members, with said shell being optionally removably attachable to the intermediate housing in substitution of the upper housing.

34. The electronic module of claim 33 wherein said opening has a substantially similar outline as a contour and dimension of the opened plane, such that when said shell is mounted on the opened upper end of the intermediate housing, said shell is aesthetically and securely compatible with the intermediate housing relative to a conventional mounting of the upper housing on the intermediate housing.

35. An electronic module for enhancing operation of a parking meter having an indicator, said electronic module comprising:

an electronic display screen configured to display a promotional message to a user of the parking meter, said electronic display screen comprising a programmable memory and an input circuitry;

a sensor detecting a condition of the indicator when the indicator is in an indicating mode, said sensor generating a signal indicative of said detected condition of the indicator;

electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the parking meter, said message identifies said detected condition of the indicator; and a vehicle sensor for detecting from a distant point a vehicle parked in a parking space in proximity with the parking meter, said vehicle sensor generating a vehicle signal, said electronic display screen input circuitry connected to said electronic circuitry in a manner to receive said vehicle signal, in response to receipt of said vehicle signal by said input circuitry said display screen displaying a promotional message to the user of the parking meter.

36. An electronic module for enhancing operation of a parking meter having an indicator, said electronic module comprising:

a light operable in an ON mode and an OFF mode;

a reset receiver;

a sensor detecting a condition of the indicator when the indicator is in an indicating mode, said sensor generating a signal indicative of said detected condition of the indicator; and electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the parking meter, said message identifies said detected condition of the indicator, said light being operable in said ON mode by said electronic circuitry with generation of said message, and operable in said OFF mode by said reset receiver on receipt of a reset signal from a remote transmitter, such that when said light is in said ON mode, the parking meter is visible from a distance.

37. An electronic module for enhancing operation of a meter having an indicator, said electronic module comprising:

a shell defining a hollow conformation attachable to the meter;

a sensor detecting a condition of the indicator when said shell is attached to the meter and the indicator is in an indicating mode, said sensor generating a signal indicative of said detected condition of the indicator;

electronic circuitry connected to receive said condition indicating signal from said sensor, said electronic circuit processing said condition indicating signal to generate a message in response to said condition indicating signal, said message including at least an identification of said detected condition of the indicator, such that when said electronic module is used with the meter, said message identifies said detected condition of the indicator; and a wireless transmitter connected to said electronic circuitry and configured to transmit said message to a remote receiver in a wireless transmission mode.

* * * * *